UNITED STATES PATENT OFFICE.

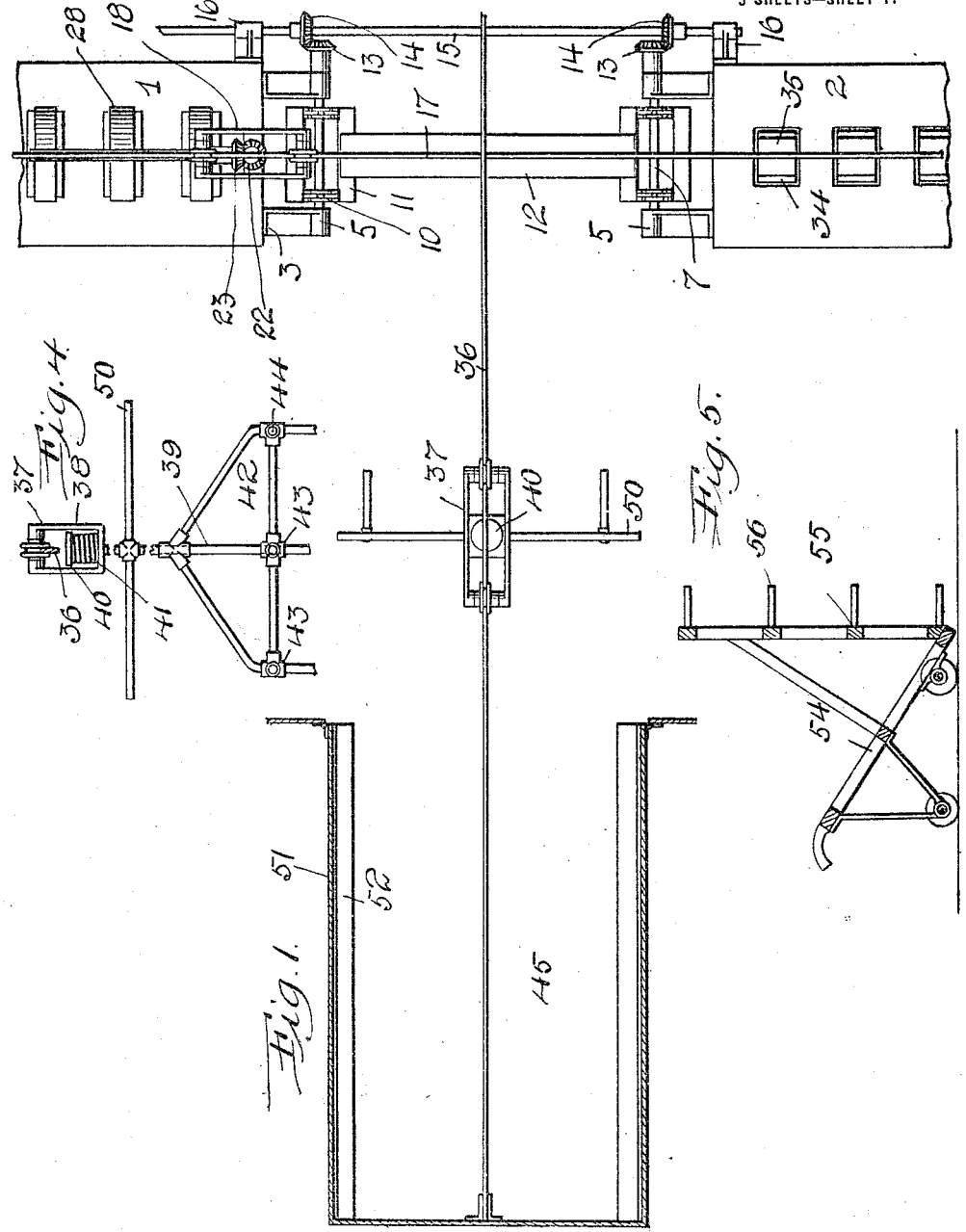

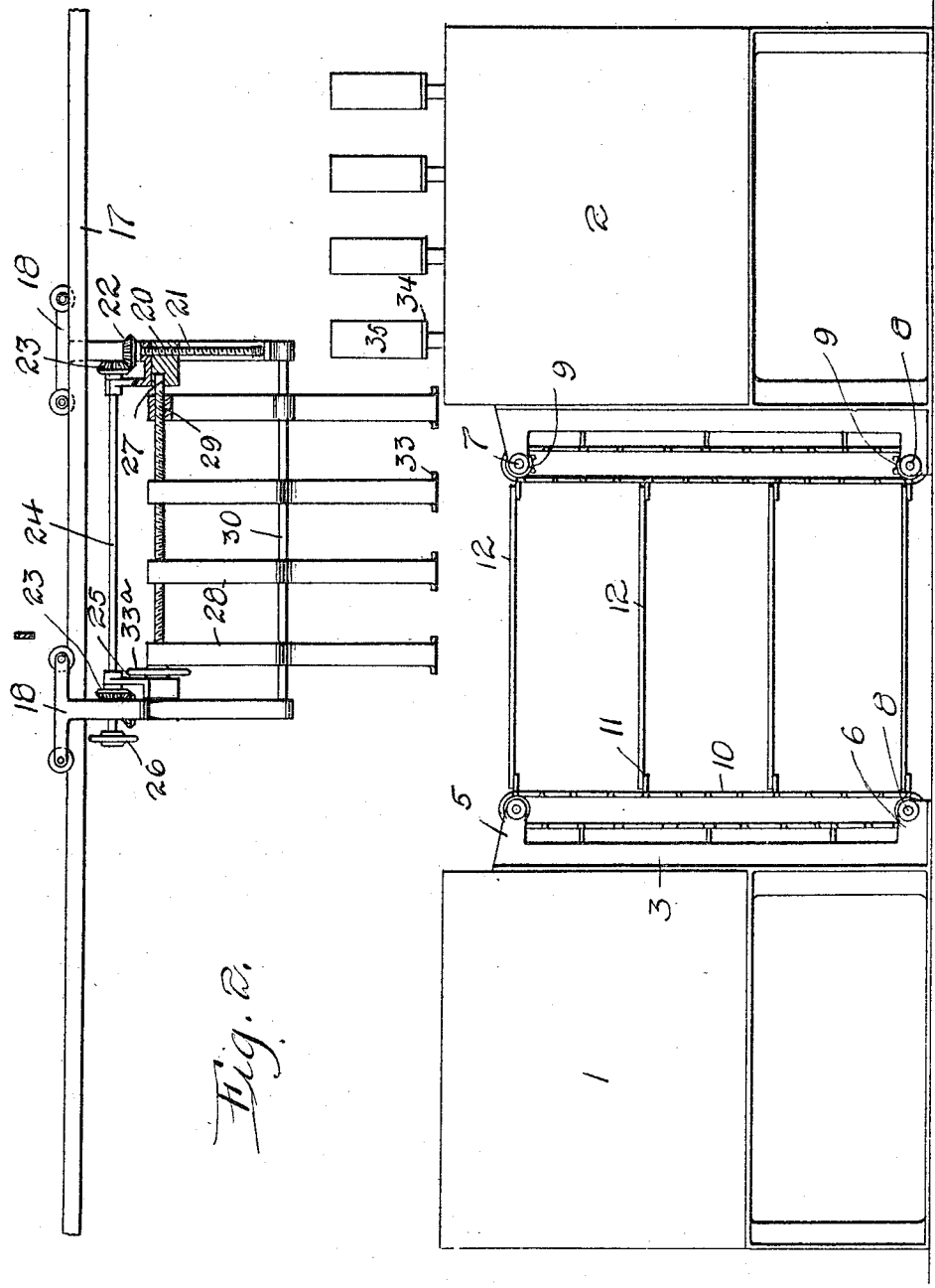

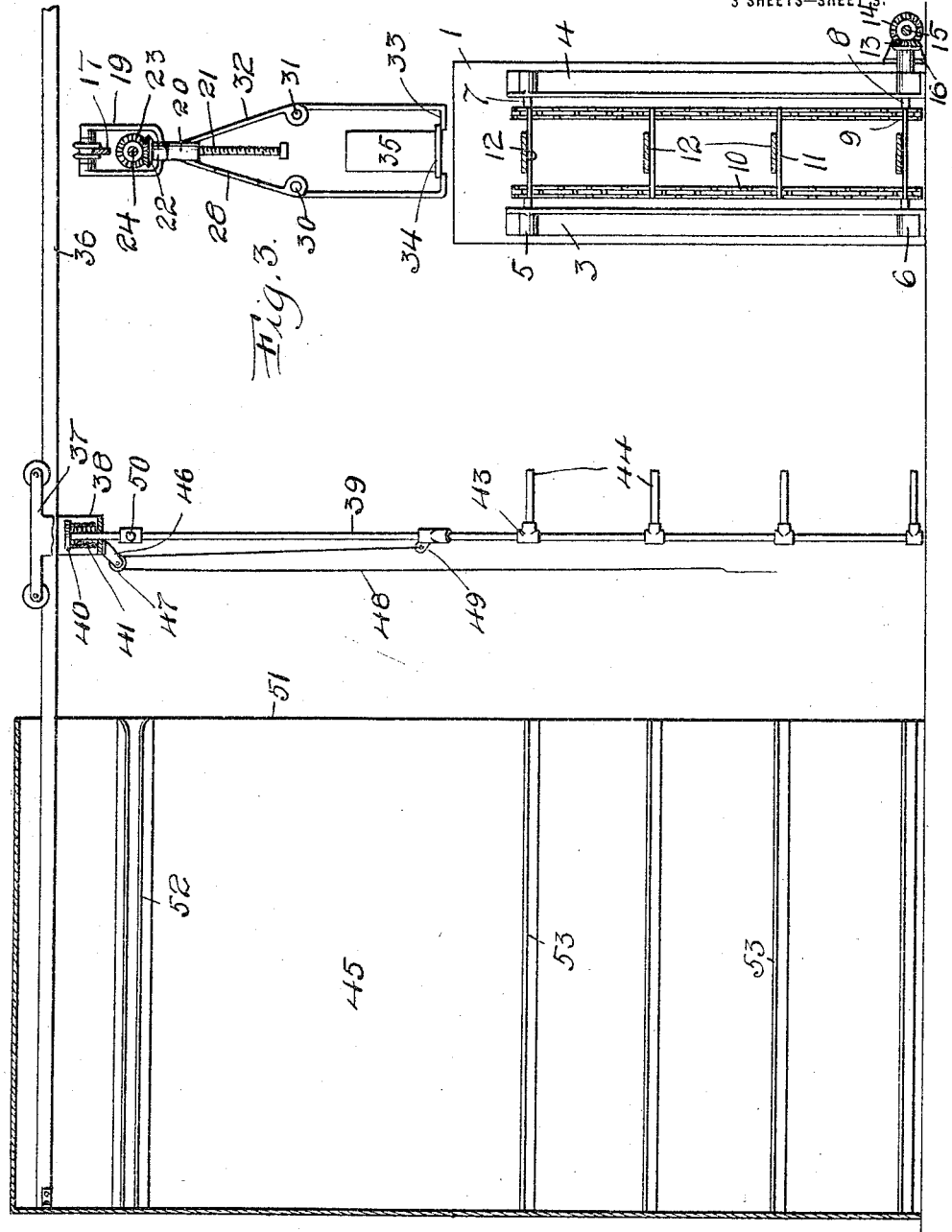

ALBERT A. PAULY, OF YOUNGSTOWN, OHIO.

CONVEYING APPARATUS FOR MOLDED BLOCKS.

1,284,137.   Specification of Letters Patent.   Patented Nov. 5, 1918.

Application filed October 9, 1913, Serial No. 794,333. Renewed November 5, 1915. Serial No. 59,888.

*To all whom it may concern:*

Be it known that I, ALBERT A. PAULY, a citizen of the United States of America, residing at Youngstown, in the county of Mahoning and State of Ohio, have invented certain new and useful Improvements in Conveying Apparatus for Molded Blocks, of which the following is a specification, reference being had therein to the accompanying drawing.

This invention relates to a conveying apparatus for molded blocks or other articles and has for its object to provide means, in a manner as hereinafter set forth, for conveying molded blocks or other articles from a molding machine to a curing chamber.

Further objects of the invention are to provide a conveying apparatus which is simple in its construction and arrangement adjustable whereby various size blocks can be transported, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to without departing from the scope of the claims hereunto appended.

In the drawings wherein like reference characters denote corresponding parts throughout the several views:—

Figure 1 is a top plan view of a conveying apparatus in accordance with this invention;

Fig. 2 is a front elevation partly in section;

Fig. 3 is a side elevation partly in longitudinal section;

Fig. 4 is an elevation, broken away of the carrier, and

Fig. 5 is a sectional elevation of a modified form of carrier.

Referring to the drawing, 1 and 2 denote, by way of example, a pair of molding machines of known construction, and of that class wherein the molded articles are discharged from the top, and between said molding machines are arranged two pairs of vertically disposed spaced supports 3 and 4 and each support has projecting therefrom at its upper end an arm 5 and at its lower end an arm 6. Journaled in each pair of arms 5 is a shaft 7 and journaled in each pair of arms 6 is a shaft 8. The shafts 7 and 8 of one pair of supports oppose the shafts 7 and 8 of the other pair of supports, and mounted upon each of said shafts, in proximity to each end thereof, is a sprocket wheel 9, the sprocket wheels carried by the shafts 7 are arranged in alinement to the sprocket wheels 9 carried by the mating shafts 8. Endless belts 10 in the form of sprocket chains are arranged on the alined sprockets 9. The pairs of belts 10 are connected together by outwardly projecting spaced cross bars or supporting strips 11, which constitute what may be termed shelves for supporting planks or trays 12. The strips 11 of one pair of belts 10 are arranged opposite the strips 11 of the other pair of belts 10, during the travel of the belts, whereby the ends of the planks 12 can be supported upon the strips, as clearly illustrated in Figs. 1 and 2.

The shafts 8 each carry a bevel gear 13, and these gears mesh with bevel gears 14 on a drive shaft 15, the latter being supported in bearings 16, which may be secured on the machines 1, 2. The shaft 15 is connected to a suitable driving mechanism and when operated will cause the adjacent sides of the belts 10 to travel simultaneously in the same direction.

Arranged over the machines 1, 2 and the space between the machines, is a track 17 upon which travels a pair of trolleys 18, and suspended from each of the trolleys 18 is a yoke 19 having attached thereto, through a threaded adjusting screw 21, a support 20.

The adjusting screws 21 have their upper ends provided with bevel gears 22 which mesh with bevel gears 23 carried by a shaft 24 journaled in brackets 25, fixed to the supports 20. The shaft 24 projects outwardly from one of the yokes 19 and is provided with a hand wheel 26 for turning it to adjust the supports vertically in either direction.

Rotatably mounted in the supports 20 is a shaft 27 having right hand threads on one half and left hand threads on the other half. The shaft 27 carries a series of hangers 28 formed with threaded openings 29 for engaging with the threads of the shaft 27. The hangers 28 have sliding engagement intermediate their ends with guide rods 30 and 31 which are supported on the parts 20 by means of brackets 32. The shaft 27 is provided with an operating wheel 33ᵃ. When rotated in one direction, the hangers 28 will be moved toward each other and when revolved in the opposite direction will be moved away from each other. The lower end of each of the hangers is inturned as at 33 and constitutes what may be termed a supporting ledge. The function of the hangers 28 is to engage under the pallets 34 which support the molded block or article and elevate the pallets with the molded article from the machine and transport them to plank 12.

When the hangers 28 are positioned below the pallets 34, the wheel 26 is rotated in one direction whereby the hangers are elevated and the pallets with the molded articles lifted from the molding machine. By revolving the wheel 33, the shaft 27 is revolved and the hangers 28 and the pallets 34 thereon are brought close together. By this arrangement provision is made for properly positioning the pallets on the planks or trays 12 so that they can enter a curing chamber if the latter should be narrower than the distance between the pallets when taken from the machine, and provision is also made, whereby if desired the pallets can be separated. Primarily the adjustment of the supporting elements is to reduce the distance between the pallets to enable a reduction in steam or curing room space.

When the hangers 28 have been adjusted to desired position, the transporting mechanism is shifted upon the track 17 to a position over the plank 12. The wheel 26 is then revolved so as to lower the hangers 28. The planks 12 are narrow so that the ledges 33 will pass downwardly along the edges of the same and deposit the pallets 34 on the planks.

Arranged over the track 17 and disposed at right angles with respect thereto is a track 36, upon which is mounted a trolley 37 having a supporting yoke 38 depending therefrom and extending through the base of said yoke is a vertically disposed rod 39 having a head 40 at its upper end and surrounding said rod 39 and interposed between the head 40 and the base of the yoke 38 is a resilient support 41 in the form of a coiled spring.

Vertically movable upon the rod 39 is a carrier frame 42, the latter being connected to the rod 39 by the sleeves 43. The carrier frame 42 includes a series of tiers of supporting brackets 44 for the planks 12 when carrying the latter to the curing chamber 45. Depending from the yoke 38 is an arm 46, carrying a pulley 47 over which passes a flexible rope or chain 48, having one end attached to a lug 49 which projects from the top of the carrier frame 42, the rope or chain 48 being for the purpose of raising and lowering the frame 42. The rod 39 is also provided with guide members 50.

The track 36 extends into the curing chamber 45 and the inner faces of the side walls 51 of the curing chamber 45 are provided with guideways 52, for the guide members 50 and ledges 53 for supporting planks 12.

It will be assumed that the hangers 28 have positioned a plurality of pallets with the molded articles upon the upper plank 12, the belts 10 are shifted to lower the loaded plank, and another plank is placed upon the next pair of strips 11. Another set of pallets with the molded articles are set upon the last mentioned plank. The belts 10 are again operated to lower the two loaded planks. This operation is continued until the desired number of planks are arranged on the belts 10. As illustrated, the carrier 42 is constructed to convey 4 planks simultaneously from the belts into the curing chamber, but this number may be increased or diminished if desired. The trolley 37 is shifted on track 36 to position brackets 44 beneath the planks 12 on the belts 10 and then the carrier 42 is lifted by means of rope 48 to remove the planks from the belts. The carrier is then shifted away from the belts, the rod 39 turned and the carrier then shifted into the curing chamber to position the planks upon the ledges 53. When the carrier is shifted into the curing chamber the guide members 50 travel in guideways 52 thereby preventing any lateral shifting of a carrier. At the desired point the carrier is lowered until the planks engage the ledges 53 and is then removed from the drying chamber.

In Fig. 5 of the drawings, a modified form of carrier is illustrated which consists of a truck 54, provided with an upright frame 55 carrying supports 56 for the planks 12. The supports 56 are positioned below the planks, the truck is tilted and the planks can then be removed from the strips 11 and with the molded articles thereon transported into the drying chamber and deposited upon the ledges 53.

What I claim is:

1. In apparatus of the class described the combination of a frame adapted for movement along a trackway, a plurality of vertically arranged screws thereon, means whereby said screws are rotated in unison, supports carried by said screws, a horizontally arranged screw carried by said supports, and one or two article carriers on the last-mentioned screw and adjustable horizontally thereby.

2. In apparatus of the class described the combination of a frame adapted for movement along a trackway, a plurality of vertically arranged screws thereon, means whereby said screws are rotated in unison, supports carried by said screws, horizontally arranged right and left hand threaded means carried by said supports, and article carriers on said means and adjustable horizontally thereby.

In testimony whereof I affix my signature in the presence of two witnesses.

ALBERT A. PAULY.

Witnesses:
  MAX H. SROLOVITZ,
  O. H. BATEMAN.

Copies of this patent may be obtained for five cents each, by addressing the "Commissioner of Patents, Washington, D. C."